Oct. 16, 1951     C. H. BEARE     2,571,655
APPARATUS FOR MIXING RUBBER COMPOUNDS AND THE LIKE
Filed Dec. 13, 1947     2 SHEETS—SHEET 1

INVENTOR
CHARLES H. BEARE
By
Spencer Hardman & Lehr
his ATTORNEYS

Oct. 16, 1951     C. H. BEARE     2,571,655
APPARATUS FOR MIXING RUBBER COMPOUNDS AND THE LIKE
Filed Dec. 13, 1947     2 SHEETS—SHEET 2

INVENTOR
CHARLES H. BEARE
BY
Spencer Hardman & Fehr
his ATTORNEYS

Patented Oct. 16, 1951

2,571,655

UNITED STATES PATENT OFFICE 2,571,655

APPARATUS FOR MIXING RUBBER COMPOUNDS AND THE LIKE

Charles H. Beare, Dayton, Ohio, assignor to General Motors Corporation, Detroit, Mich., a corporation of Delaware Application December 13, 1947, Serial No. 791,585

6 Claims. (Cl. 259—11)

This invention relates to a means and method for accurately mixing the various ingredients of a rubber or similar compound in a large power-driven mechanical mixing machine such as a Banbury mixer, according to the predetermined cycle of operations desired for the particular compound to be mixed.

The various ingredients of a rubber compound batch may include crude and/or synthetic rubber, reclaim rubber, masters, powders, and various oils, etc., all of which for uniform results should be fed into the large mechanical mixer in definite quantities in definite sequence and at predetermined time intervals during the total elapsed time for mixing one batch of the compound. Such definite quantities, sequence and time intervals to give the best results may be first determined by the rubber compounding chemist who prescribes the specifications for each compound. These specifications should be closely followed in the mixing procedure for each specific compound. It has been found to be very important for uniform results that such specifications be accurately followed when mixing rubber compounds in a large mechanical mixer, such as a Banbury mixer. In present day procedure the successive batches of mixed compound coming from the Banbury mixer even though intended to be exactly the same, will not be uniform but will vary so much, one batch from the other, that each individual batch must be separately tested and then treated in accordance with the individual characteristics revealed by such tests. Otherwise the vulcanized rubber products made from a succession of batches will not have uniform characteristics, with the result that many of the vulcanized products must be scrapped after much labor and material has been expended thereupon.

The general object of this invention is to provide a coordinated means for loading the mixer with the various ingredients of the compound in the specified predetermined quantities and sequence and at the specified predetermined time intervals during the mixing operation of a particular batch, and to precisely repeat such loading operations with each successive batch of that particular compound.

Another object is to provide an apparatus so constructed and coordinated as to automatically repeat precisely the same operations for each batch according to the predetermined specifications for that particular compound.

Another object is to provide such an apparatus which is adapted to use any selected one of a series of readily interchangeable formula control means, the selected formula control means serving to accurately govern and precisely repeat the cycle of operations according to the characteristic mixing sequence prescribed thereby. The same holds true for any other selected formula control means which may be inserted into the apparatus when it is desired to stop making one specific compound and to begin making another specific compound.

Ordinarily the major operations that are performed during the mixing operation of a Banbury mixer, or the like, are: (1) intermittently operating the hopper door which permits various ingredients previously dumped into the inlet hopper to pass into the mixing chamber; (2) raising and lowering the mixer ram which forces the ingredients, after they pass thru the hopper door, down into the mixing chamber and retains said ingredients in effective contact with the rotating mixing arms of the mixer; (3) opening and closing the dump door at the bottom of the mixing chamber which permits the final mixed batch to pass out of the mixing chamber.

The apparatus of this invention provides for the loading of the various ingredients into the mixer in predetermined quantities and at predetermined time intervals, and also provides the coordinated performance of the above-mentioned major operations on the mixer itself, whereby the entire cycle of operations necessary to efficiently produce successive batches having very uniform characteristics are precisely repeated automatically according to the selected formula control means being used at the time. The general object of this invention therefore is to accomplish this result. Other objects of this invention will appear hereinafter from the more detailed description of the apparatus and method of operation thereof.

In the drawings:

Fig. 2 is matched up with Fig. 1 along the line X—X of each of these figures a perspective diagrammatic view of the apparatus as a whole will result.

Similar reference characters refer to similar parts throughout the drawings.

Figure 1:
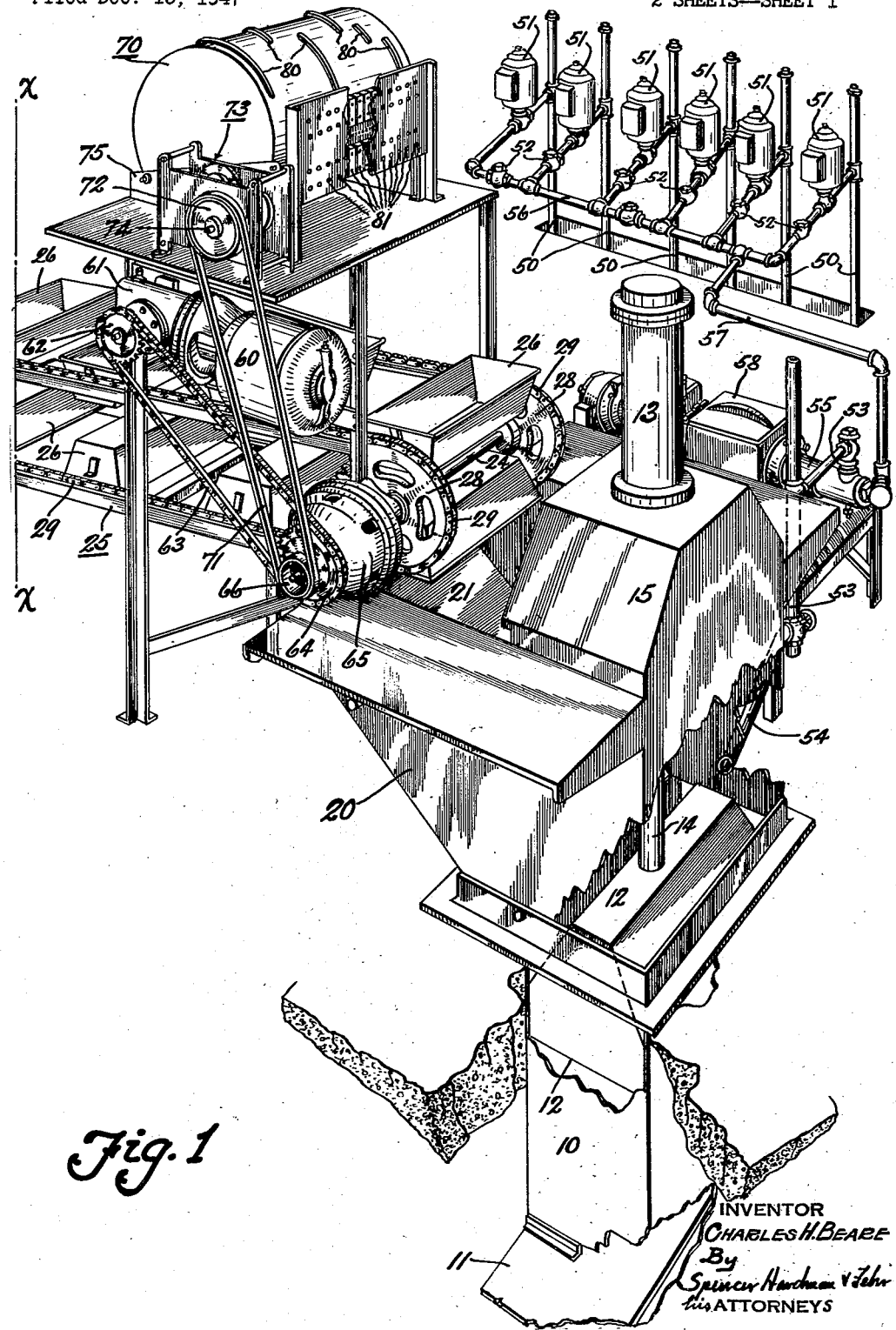
Fig. 1 is a diagrammatic perspective view of a portion of a Banbury mixer together with a perspective view of a portion of the apparatus of this invention, and illustrates the means for controlling the cycle of the entire mechanism.

Only such portions of a large mixer for mixing rubber compounds are diagrammatically illustrated as are necessary for a clear description of this invention, since such mixers are now well known and a complete illustration thereof would not aid but rather complicate and confuse the clear disclosure of this invention. The mixing chamber of a mixer of the Banbury type which contains the large heavy power-driven rotating mixing arms (not shown) is diagrammatically shown at 10, and the swinging dump door 11 at the bottom of chamber 10 is shown in closed position. The automatically operated vertically movable ram 12 is used to retain the compound ingredients, after they pass from hopper 20 into mixing chamber 10, pressed down into effective contact with the rotating mixing arms in the mixing chamber 10. Ram 12 is raised and lowered at the desired times by means of a power cylinder 13 containing a suitable reciprocating piston connected to the shank 14 of ram 12. When ram 12 is raised to its top position in the housing 15 it is located above the inlet opening thru which the compound ingredients enter mixing chamber 10 from hopper 20. The hopper door 21 is quickly swung upward to closed position when it is desired to dump all the contents of hopper 20 into mixing chamber 10, and said door 21 is then kept closed until just prior to the next dumping of materials into hopper 20, according to the predetermined cycle of operations as governed by the cycle controller hereinafter described.

An endless conveyor 25, carrying a large number of buckets 26, is arranged to convey the various compound ingredients from a series of stationary storage hoppers 27 to the Banbury hopper 20. Each bucket 26 dumps its contents into hopper 20 when it is inverted as it passes around the chain sprockets 28 which drive the endless chains 29 of conveyor 25. A separate storage hopper 27 is provided for each of various solid ingredients which form the compound, that is, for all such ingredients which can be properly and efficiently handled by the hoppers 27 and the weighing and dumping mechanism which transfer predetermined quantities of the ingredients from hoppers 27 to the buckets 26.

Figure 2:
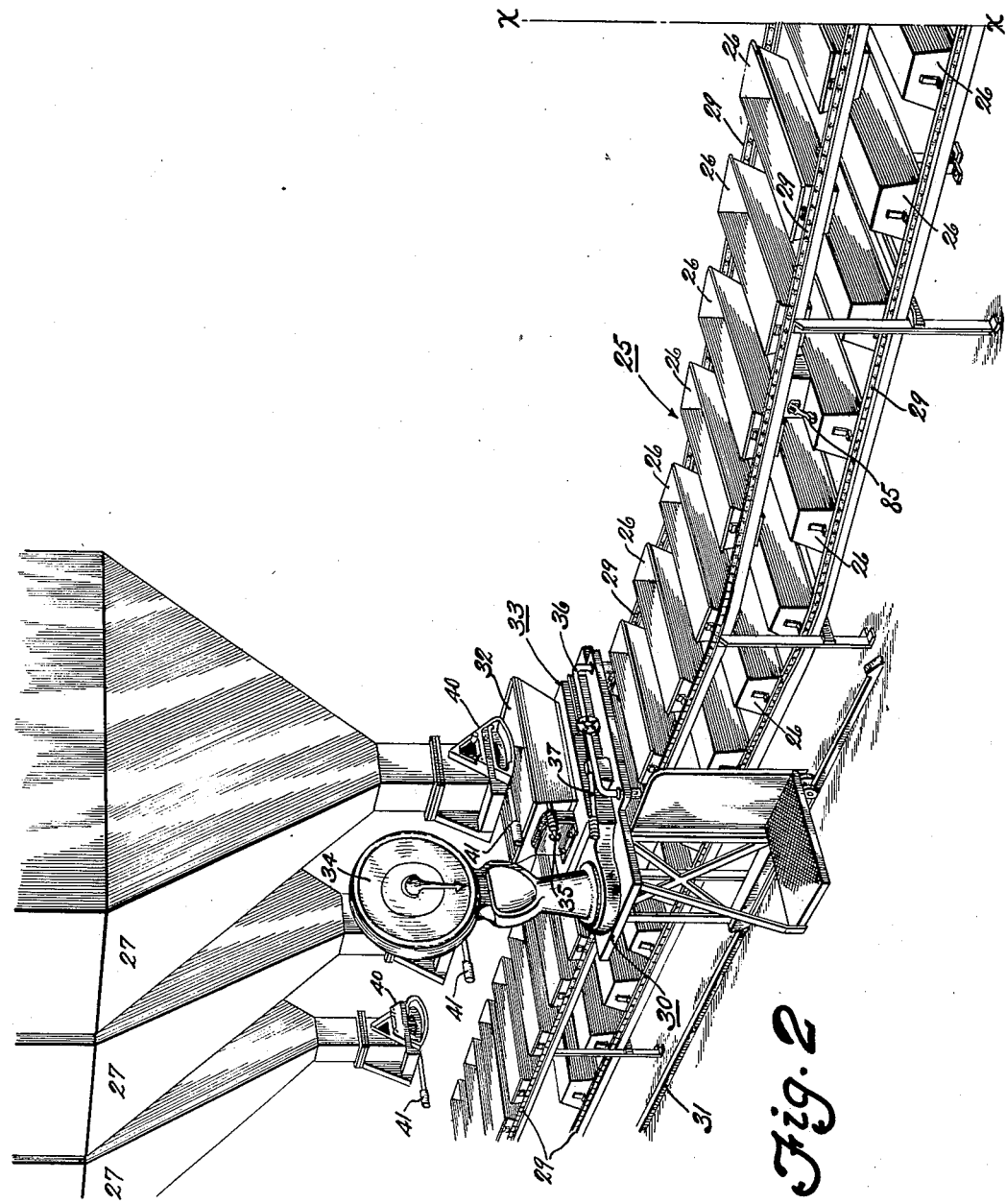
Fig. 2 is a perspective view of additional portions of the apparatus of this invention and in effect forms a continuation of Fig. 1. That is, if

A weighing larry 30 is supported by and arranged to run to and fro at will on a suitable stationary track 31 which is shown in Fig. 2 as supported on the room floor. Larry 30 comprises a weighing hopper 32 which first receives the material from storage hoppers 27, a weighing scales 33 which continuously shows the weight of material in hopper 32 on the large dial 34, a dumping hand-crank 35 by means of which an attendant dumps the contents of hopper 32 into the particular selected bucket 26 over which hopper 32 has been positioned by moving the entire larry 30 along its track 31, and an interlock mechanism 36, actuated by its hand lever 37, by means of which the entire larry 30 is locked to conveyor 25 so as to insure exact location of hopper 32 over the selected bucket 26 which is to be filled at the moment. Larry 30 is first moved along its track 31 to locate its weighing hopper 32 directly under the outlet valve 40 of any desired one of storage hoppers 27. Then outlet valve 40 of the selected hopper 27 is opened by the attendant by means of the hand lever 41 and the material permitted to flow into weighing hopper 32. The attendant watches dial 34 which continuously shows the weight of material in hopper 32 and closes valve 40 as soon as the desired weight of material has been deposited therein. Thereupon the attendant moves the entire larry 30 to the desired bucket 26, operates interlock mechanism 36 by means of lever 37 to insure exact location over said bucket 26, then dumps the contents of weighing hopper 32 into the bucket by operating hand crank 35. If the amount of weighed contents in hopper 32 is to be deposited in more than one bucket 26, the attendant merely repeats the locating and dumping operation for each such bucket 26 and so continues until all the weighed material has been deposited in the predetermined buckets 26. Other ingredients in the other storage hoppers 27 may be similarly weighed and deposited in the correct buckets 26 of the conveyor 25, that is, in the correct predetermined order along the length of the conveyor.

As an illustration, the first seven or eight buckets 26 to be dumped into hopper 20 of the Banbury mixer during one cycle of operation may contain predetermined amounts of crude rubber, synthetic rubber, various types of reclaim rubber, masters, and mineral rubber, or any combination of such ingredients. Then the next seven or eight buckets 26 may be filled with the proper weighed amounts of powdered or granulated pigments, fillers, or softeners, all in the proper predetermined sequence specified by the compound card for making that particular compound. The conveyor 25 should be at least sufficiently long and have enough buckets 26 to provide for the maximum number of different solid ingredients and quantities thereof which may be specified for making one batch of compound.

The liquid ingredients of the compound, such as the customary oils, flow under suitable pressure and in heated ducts to a metering unit 55 which determines the volume of each separate liquid ingredient injected into the mixing chamber 10 of the Banbury mixer. In Fig. 1, a series of oil supply pipes 50 lead individually upwardly from the separate oil storage tank (not shown) into the pipe manifold 56 and thence thru pipe 57 to the oil metering unit 55. The oil flow to the metering unit 55 thru each of the oil supply pipes 50 is controlled by the electrically actuated solenoid valves 51. Also each pipe 50 is provided with an individual check valve 52 between its solenoid valve 51 and the pipe manifold 56 to prevent possibility of any mixing of the various oils in pipes 50. The measured oil passes from the metering unit 55 thru its outlet pipe 53 and thence thru pipe 54 directly into the mixing chamber 10 of the Banbury mixer when ram 12 is in raised position. When any one of solenoid valves 51 is opened by closing its solenoid circuit, oil will flow under pressure from that particular storage tank to the metering unit 55, from which the oil is delivered into mixing chamber 10 through pipe 54. The volume of oil so flowing will be determined by the number of strokes of the metering unit 55 as controlled by its stroke counter 58. Thus the volume of oil added to the compound in mixing chamber 10 at any one opening of any one of solenoid valves 51 may be accurately controlled by controlling the number of strokes of the metering unit 55. The coordinated cyclic control of stroke counter 58 and of all of the electrically controlled devices of the entire apparatus is accomplished by a single formula control device as will be hereafter described.

The conveyor 25 is power driven by sprockets 28 fixed to shaft 24. Shaft 24 is driven by a constant speed electric motor 60 thru speed reduction gear box 61, small sprocket 62, sprocket chain 63, clutch sprocket 64, and the electro-magnetic clutch 65 which may be engaged or disengaged by an electric control circuit which excites the clutch field coils. The driving element of clutch 65 is fixed to sprocket 64 and both rotate freely on shaft 24 when the magnetic clutch 65 is disengaged. Hence shaft 24 and conveyor 25 are not driven by the electric motor 60 except when the driving and driven elements of clutch 65 are engaged.

However pulley 66 is fixed to sprocket 64 and both are continuously driven by the constant speed motor 60, even though shaft 24 and conveyor 25 be stationary. The automatic operation of the entire apparatus originates from the formula control drum 70 which is continuously rotated at a uniform rather slow speed by means of suitable friction drive rollers mounted in the drum-supporting carriage 75. Such friction rollers are in turn driven by pulley 66, belt 71, pulley 72, shaft 74 and a speed variator mechanism 73 which can be set by the attendant to give any desired gear reduction ratio between its driven shaft 74 and its drive shaft (not shown) which drives the friction rollers which in turn drive the control drum 70. It will now be clear that, after the speed variator 73 has been set by the attendant to give the selected gear reduction ratio, the control drum 70 will be continuously driven at a relatively very slow uniform speed and will be continuously geared with the driving element of clutch 65 regardless of whether clutch 65 is engaged or disengaged. When clutch 65 is engaged by its control circuit so as to drive shaft 24 the control drum 70 will then be accurately geared with the conveyor 25.

The control drum 70 is rotated at the selected slow uniform speed and one complete revolution thereof takes place during one complete cycle of the entire apparatus for mixing one batch of compound in the Banbury mixer, that is, drum 70 makes only one revolution in the total time required to complete all operations of whatever nature involved in the intermittent dumping into hopper 20 of buckets 26 containing the various solid compound ingredients, the intermittent addition to the batch of the various oils and the metering thereof, the corresponding coordinated movements of the hopper door 21, ram 12, dump bottom 11, and the mixing periods of the various materials in mixing chamber 10. Therefore the control drum 70 may be provided with a series of separate control devices which will individually actuate the various mechanisms of the apparatus at the proper moment in the cycle to give the desired result.

In the form illustrated in Fig. 1, drum 70 has fixed to its outer cylindrical surface a series of peripherally extending raised cams 80 of predetermined lengths and variously arranged relative to an index line or zero mark on the surface of the drum 70. Each cam 80 actuates a stationary electric micro-switch 81 when it comes in contact therewith, and thus establishes an electric circuit which actuates, through any suitable and well-known servo-means, some one of the devices of the apparatus hereinabove described. The peripheral length of each cam 80 determines the fraction of the entire cycle during which its particular switch 81 is held closed, and hence determines the time period the corresponding device of the apparatus is kept in operation. For instance, each of the electrically actuated solenoid valves 51 is opened by an individual cam 80 and is maintained in open position so long as the peripheral length of its cam 80 holds its particular switch 81 closed. The volume of oil passing into mixing chamber 10 is determined by the oil metering unit 55 and its stroke counter 58 whose number of strokes at any period of oil injection may be electrically controlled by the peripheral length of its cam 80. The electromagnetic clutch 65 is energized by another one of the cams 80, which results in engaging the clutch and causing the conveyor 25 to travel and start dumping its buckets 26 into hopper 20. The number of buckets so dumped at any one time depends upon how long clutch 65 remains energized and hence upon the length of its cam 80. The conveyor 25 is stopped in substantially exact location and thus prevented from overrunning due to its momentum, by an electrically actuated friction device 85 which is also actuated at the proper moment by a cam 80. All of the necessary movements of the hopper door 21, ram 12 and dump bottom 11 are also each controlled by a cam 80 by energizing a circuit which actuates any suitable form of servo-means for actually performing said necessary movements. The servo-means which supplies the necessary power for raising and lowering ram 12 is the power cylinder 13 having suitable piston and valves (not shown). The inlet and outlet valves which govern the admission and exhaust of operating fluid to and from cylinder 13 are properly actuated in a well known manner by electro-magnetic means energized by circuits established by a cam 80. The operating fluid for cylinder 13 is preferably steam or compressed air. The hopper door 21 and the dump bottom 11 may also be properly operated by a similar power cylinder or by any other suitable and well-known servo means. All the automatically operated mechanisms of the entire apparatus may be similarly operated at any desired moment in the entire cycle of the apparatus by cams 80 together with suitable servo-means energized by said cams.

The formula control drum 70 has all its various cams 80 so arranged relative to the index line or zero mark thereon as to perform all the automatic operations of the apparatus at precisely predetermined times in any one cycle of operations. Thus the mixer is loaded with the predetermined ingredients of the compound in the correct predetermined quantities and sequence and at the correct predetermined time intervals during the mixing operation of a single batch. After one batch is fully mixed and dumped from the mixer through dump bottom 11 the cycle is completed, and the same cycle of operations for a second batch will be precisely repeated by the next complete revolution of drum 70. Thus all completed batches controlled by a particular drum 70 will have greatly improved uniformity in their physical and chemical or vulcanizing characteristics, which is a very important advantage resulting from this invention. Heretofore the successive batches of compound coming from a Banbury mixer, when it is loaded and controlled by hand in the customary manner by one or several attendants, will not have very uniform characteristics but will vary in uniformity to such extent that each batch must be separately tested by a control expert in order to determine what subsequent treatment is required before making vulcanized articles therefrom.

The procedure of loading and mixing the ingredients into a finished batch by the apparatus of this invention may be as follows:

The operator selects the specific formula control drum 70 for making the specified formula and properly places said drum upon its cradle 75 so that it presses directly against the friction rollers which support and drive it. The operator also sets the speed variator 73 so that drum 70 will make one complete revolution during the total elapsed time required for mixing and dumping the batch as specified by that specific formula. The conveyor buckets 26 having been loaded with the compound ingredients in the quantities and sequence specified by that formula, the operator starts motor 60. Drum 70 is slowly rotated and the time cycle for the first batch begins when the index or zero line on drum 70 rotates past the stationary zero point. Thereafter the various cams 80 on drum 70 actuate the various electric switches 81 at the proper moments to perform the following operations (as an example):

(1). Electro-magnetic clutch 65 is energized to move conveyor 25 until the number of buckets 26 specified by that formula, say the first seven buckets, dump their contents into hopper 20 of the Banbury mixer. Clutch 65 is then automatically disengaged and conveyor 25 is stopped in exact location by the electrically controlled stopping device 85 (Figure 2) which stops any free travel of conveyor 25 due to its momentum.

(2). Hopper door 21 (shown in Fig. 1 in its open inclined position) then swings upward about its bottom hinges and slams shut against housing 15, dislodging any materials which may have stuck to door 21, and so dumps all the contents of hopper 20 down into mixing chamber 10 while ram 12 is in its raised or top position.

(3). Ram 12 is then lowered to press down and retain all newly dumped materials down into effective contact with the heavy rotating arms (not shown) of the Banbury mixer in chamber 10. Ram 12 remains down for a certain time as specified by the formula, until the dumped materials have been properly mixed into a homogeneous mass.

(4). Ram 12 is raised to its top position above the hopper inlet and hopper door 21 is opened to position shown in Fig. 1.

(5). Clutch 65 is again energized, again starting conveyor 25 to dump the next specified number of buckets, say the next six buckets, into hopper 20, after which clutch 65 is disengaged and conveyor 25 is again stopped in exact location by limit stop 85 as before.

(6). Hopper door 21 again swings shut as before.

(7). Ram 12 is again lowered and remains down for the specified time until all the newly dumped materials have been taken up and properly mixed into that portion of the batch already being mixed in chamber 10.

(8). Ram 12 is raised and the oil metering unit 55 is started. The first oil to be added to the mix through oil injection pipe 54 is permitted to pass to metering unit 55 by opening its solenoid valve 51. The specified volume of this oil is measured by the stroke counter 58 and the number of strokes thereof is controlled by a cam 80. Each of the various oils to be added to the mix is similarly measured and added at the specified times during the mixing of the batch.

(9). Hopper door 21 again swings to open position.

(10). Clutch 65 is again engaged, starting movement of conveyor 25 and so dumps a third specified group of buckets 26 into hopper 20.

(11). Hopper door 21 slams shut and ram 12 lowers and remains in depressed position for the specified period until the newly added material or materials has been properly mixed into the batch.

(12). The above operations are repeated as necessary until all the various groups of buckets 26 have been added to the batch in mixing chamber 10, and until all the specified oils have been added to the batch at the specified times.

(13). Preferably an electric alarm bell is rung by a cam 80 one minute before the batch is about to be dumped from the Banbury mixer.

(14). To dump the completely mixed batch, ram 12 raises, hopper door 21 swings to open position, and dump bottom 11 swings open and remains open until the entire batch has been emptied from chamber 10.

(15). Dump bottom 11 swings shut, which completes the cycle of operations for one batch and the apparatus is then ready to start a new batch. This same cycle is repeated continuously on successive batches until the operator stops the apparatus.

The conveyor 25 may be sufficiently long and have a sufficient number of buckets 26 to make several successive batches after once filling said buckets in the proper order for that purpose. However since conveyor 25 remains stationary a good part of the elapsed time of one complete cycle, the attendant who fills buckets 26 and who weighs out the ingredients from storage hoppers 27 with weighing larry 30, as described above, may fill buckets 26 in the proper order during the periods while conveyor 25 is stationary. Thus buckets 26 may be always kept filled sufficiently ahead of the dumping end of conveyor 25 as to permit the apparatus to be run continuously. The irregular chunks of rubber ingredients (natural, synthetic, or reclaim) may be weighed out into a series of suitable containers which are later dumped into buckets 26 by hand if such material can not be conveniently handled by hoppers 27 and the weighing larry 30. It is necessary only that such material be dumped into the proper group of buckets 26 for each batch in the order specified by the particular mixing formula being used at the time. For example, assuming that 200 lbs. of crude rubber are to be dumped into the Banbury hopper 20 at one time, for instance at the start of each mixing cycle, then 200 lbs. of rubber may be weighed out into several suitable containers which are placed in proximity to conveyor 25. Then when conveyor 25 is being loaded this 200 lbs. of rubber may be quickly transferred to a predetermined group of buckets 26, say four buckets, without regard to dividing this 200 lbs. exactly between said four buckets since all four buckets will be dumped into hopper 20 in quick succession.

While the embodiment of the present invention as herein disclosed, constitutes a preferred form, it is to be understood that other forms might be adopted, all coming within the scope of the claims which follow.

What is claimed is as follows:

1. An apparatus for mixing various ingredients of a rubber compound in a compound mixer having an inlet hopper and hopper door therefor and a reciprocable ram for pressing said ingredients down into said mixer, comprising: a bucket conveyor having a series of individual buckets adapted to contain various compound ingredients in the predetermined amounts and sequence in which said ingredients are to be added to the mixer, means for intermittently moving said conveyor at predetermined times so as to dump the contents of predetermined buckets into said inlet hopper at each such movement, means for intermittently operating said hopper door and ram in cyclic coordination to permit the hopper contents to enter the mixing chamber at predetermined moments, and means for controlling the predetermined cycles of operation of said conveyor, hopper door, and ram.

2. An apparatus for mixing various compound ingredients in a compound mixer having an inlet hopper and hopper door therefor and a reciprocable ram for forcing said ingredients down into said mixer, comprising: a bucket conveyor having a series of individual buckets adapted to contain various compound ingredients in the predetermined amounts and sequence in which said various ingredients are to be added to the mixer, servo means intermittently actuated for moving said conveyor to cause a predetermined number of said buckets to dump their contents into the inlet hopper of said mixer at predetermined time periods, servo means intermittently actuated for operating the inlet hopper door of said mixer at predetermined moments to permit the hopper contents to enter the mixing chamber of said mixer, servo means intermittently actuated for operating the mixer ram in cyclic coordination with each addition of ingredients so as to force the added ingredients down into the mixing chamber, and control means continuously driven at a uniform speed for actuating each of said there servo means at predetermined moments in each cycle of operation of the apparatus.

3. An apparatus for mixing various ingredients in a compound mixer having an inlet hopper and hopper door therefor and a reciprocable ram for pressing said ingredients down into said mixer, comprising: a bucket conveyor having a series of individual buckets adapted to contain various compound ingredients in the predetermined amounts and sequence in which said ingredients are to be added to the mixer, means for intermittently moving said conveyor at predetermined time periods so as to dump the contents of predetermined buckets into said inlet hopper at each such movement, means for intermittently operating said hopper door and ram in cyclic coordination to cause the hopper contents to enter the mixing chamber at predetermined moments, control means continuously driven at a uniform speed for controlling the predetermined cycle of operations of said conveyor, hopper door, and ram, and a selective speed variator capable of adjustment while the apparatus is idle for changing the uniform speed of said control means and thereby correspondingly changing the total time period for one complete cycle of the apparatus.

4. An apparatus for mixing various ingredients of a rubber compound in a compound mixer having an inlet hopper and a hopper door therefor, comprising: a bucket conveyor arranged to discharge into the inlet hopper of said mixer and having a series of individual buckets adapted to contain various compound ingredients in the predetermined amounts and sequence in which said ingredients are to be added to the mixer, power means arranged to intermittently move said conveyor predetermined distances over predetermined time periods during a cycle of operations for mixing one batch of compound so as to deliver the contents of predetermined buckets into said inlet hopper at each such movement, power means for intermittently operating said hopper door at predetermined moments to permit the hopper contents to enter the mixer at predetermined moments in the cycle of operations for mixing one batch of compound, and control means having a series of actuating devices thereon for automatically controlling the timing of actuation of said first and second power means.

5. The apparatus claimed in claim 4 wherein said control means includes a selective control element which determines the specific cycle of operations of the conveyor and hopper door, said element being interchangeable with any selected one of a series of similar selective control elements each of which provides a predetermined cycle of operations of the conveyor and hopper door.

6. An apparatus for mixing various ingredients of a rubber compound in a compound mixer having a mixing chamber, an inlet hopper and hopper door therefor, and a dump door which when opened permits the mixed batch to be discharged from the mixer, comprising: a bucket conveyor having a series of buckets adapted to contain various compound ingredients in the predetermined amounts and sequence in which said ingredients are to be delivered to said mixer; means for intermittently moving said conveyor at predetermined intervals during a complete cycle of operations for mixing one batch of compound so as to dump the contents of predetermined buckets into said inlet hopper at each such conveyor movement; means for operating said hopper door at predetermined moments so as to cause the contents of said hopper to enter said mixing chamber; means for opening said dump door after each batch has been mixed for a predetermined time period; and a control means having a series of actuating devices thereon for controlling predetermined cyclic operations of said conveyor, said hopper door, and said dump door.

CHARLES H. BEARE.

REFERENCES CITED

The following references are of record in the file of this patent:

UNITED STATES PATENTS

| Number | Name | Date |
| --- | --- | --- |
| 1,665,060 | Hitchcock | Apr. 3, 1928 |
| 1,949,199 | Foote | Feb. 27, 1934 |
| 2,100,878 | Shallock | Nov. 30, 1937 |
| 2,108,999 | Sisley et al. | Feb. 28, 1938 |
| 2,137,928 | Tanquercy | Nov. 22, 1938 |
| 2,232,404 | Pratt | Feb. 18, 1941 |
| 2,431,058 | Manning | Nov. 18, 1947 |